UNITED STATES PATENT OFFICE 2,080,359

METHOD FOR THE PRODUCTION OF A CATALYST FOR THE REDUCTION OF SULPHUR DIOXIDE

Robert Lepsoe and James Roland Mills, Trail, British Columbia, Canada, assignors to The Consolidated Mining and Smelting Company of Canada, Limited, Montreal, Quebec, Canada, a company of Canada No Drawing. Application February 23, 1935, Serial No. 7,836

8 Claims. (Cl. 23—233)

This invention relates to an improved catalyst for the reduction of sulphur dioxide to elemental sulphur and is of particular value in accelerating and bringing to completion certain well known chemical reactions which take place when a stream of sulphur dioxide gas is brought into contact with incandescent carbon.

The chemistry of the process for the reduction of sulphur dioxide gas by bringing it in contact with incandescent carbon is well established and may be expressed by the following equations:—

$$2CO + SO_2 = 2CO_2 + \tfrac{1}{2}S_2 \qquad (1)$$

$$CO_2 + C \rightleftharpoons 2CO \qquad (2)$$

The net result of the above equations may be expressed as:

$$SO_2 + C \rightleftharpoons CO_2 + \tfrac{1}{2}S_2$$

Simultaneous with reactions (1) and (2) are the subsidiary reactions:—

$$CO + \tfrac{1}{2}S_2 \rightleftharpoons COS \qquad (3)$$

$$COS \rightleftharpoons \tfrac{1}{2}CO_2 + \tfrac{1}{2}CS_2 \qquad (4)$$

In the presence of incandescent carbon the products of reduction in addition to sulphur and $CO_2$ will always contain CO, COS and $CS_2$ in amounts depending on the temperature, pressure and the time of contact. By regulating the temperature and the gas velocity it is posible to suppress reactions (3) and (4) but at the expense of reaction (1) in that the exit gas will contain appreciable amounts of unreduced $SO_2$. Hence the reduction of $SO_2$ to elemental sulphur is either incomplete or certain amounts of subsidiary products are formed.

If the mixture of gaseous products resulting from the reduction of $SO_2$ by carbon is left alone for sufficient time in the absence of carbon they react together to form $CO_2$ and $S_2$ according to Equation (1) and reactions (5) and (6) below. Sufficient $SO_2$ for reactions (1), (5), and (6) is provided either from excess $SO_2$ in the gas mixture from such reduction or from an auxiliary source.

$$2COS + SO_2 = 2CO_2 + 3/2 S_2 \qquad (5)$$

$$CS_2 + SO_2 = CO_2 + 3/2 S_2 \qquad (6)$$

By accepting known thermodynamic constants we have calculated that by lowering the temperature the equilibrium proceeds toward the right side of the equation and finally, at temperatures at which sulphur condenses, is practically complete, but so much time would be required as to make the process impractical commercially and therefore the use of a catalyst to accelerate the reactions is necessary.

It is known that aluminum hydrate or bauxite which contains some water of hydration can be used as such a catalyst. It is known also that it is necessary to incorporate the catalytic agent into a porous coherent mass in order to retard disintegration and at the same time permit the free passage of the gas through the mass in contact with the exposed surfaces of the particles of the catalytic agent. One established method comprises mixing the catalytic agent with cement or other appropriate binding material with sufficient water to make it plastic, moulding it into a desired shape and allowing it to set. Porosity of the coherent mass is obtained by adding small percentages of any of the well known substances which react together to evolve a gas, which on passing from the interior to the exterior of the mass as it sets leaves it porous. Sodium silicate has also been used as a binding material but in use disintegrates blocking up the passages in the chamber effectively preventing the passage of the gas therethrough.

In so preparing such catalytic material, however, the active surface of the catalytic particles exposed to the action of the gas is necessarily small and in addition a great proportion of said particles is entirely surrounded by the binding material and therefore inactive.

The object of this invention is to produce a catalyst containing aluminum hydrate, or other compounds of aluminum in which at least part of the water of hydration is retained, which is physically strong to withstand the temperature of and erosive action of the gas to which it is subjected; which is highly porous to permit the free passage of the gas; and in which the area of the surfaces of the catalytic particles exposed to contact the gas is greater than heretofore has been possible to expose. We have found that by sintering the mixture containing the catalytic material at a compartively low temperature made possible by the addition of a binding and sintering agent such as sodium silicate, the particles of aluminum hydrate become fused to the binder skeleton to form prills or nodules adhering thereto, thus greatly increasing the area of the surfaces of the catalytic agent exposed to the action of the gas and at the same time at least part of the water of hydration is retained by the aluminum hydrate.

The manner in which we attain the objects of our invention comprises compounding a mixture containing a finely ground hydrate of aluminum, a binding or carrying material such as fire clay, an organic substance such as sawdust, cork or the like, and a binding and sintering agent such as sodium silicate (water glass).

After intimately mixing the various ingredients, the mixed material is moulded into suitable shape depending upon the size and type of chamber in which it is to be used, slowly dried and sintered at a low temperature in order to avoid losing all the water of hydration, the binding and sintering material, sodium siliciate, enabling us to achieve this objective. In the sintering step of the method the organic substance contained in the compound is burned out, giving porosity to the material, leaving a porous and strong aluminum hydrate containing sinter in which part of the water of hydration has been retained.

As a preferred embodiment of our invention, we take one part by volume of fire clay, one part aluminum hydrate, two parts of sawdust and mix them intimately together, adding 1.75 parts of aqueous sodium silicate having a specific gravity of approximately 1.27. This material is plastic, and bricks of suitable size may be moulded therefrom. These bricks are dried slowly in a furnace and finally subjected to sufficiently high temperature to cause sintering of the mixture and fusing of the aluminum hydrate with the aid of the sodium silicate, at the same time burning out the sawdust so as to render the bricks porous. The water of hydration is retained at least in part by regulating the temperature of the furnace during the drying and sintering of the bricks so that it shall not exceed 1100° F. the desirable temperature for the sintering being between 1000° F. and 1100° F.

Under the microscope the finished product thus prepared presents the appearance of a sintered agglomerate of fire clay and alumina, a cross section of which shows the surface of the cavities thereof covered with numerous particles of aluminum hydrate fused to the clay skeleton in the form of prills or nodules adhering to said surface, thus enormously increasing the surface area of the active catalytic agent exposed to the action of the gas which greatly increases the efficiency of our catalyst over that which it was heretofore found possible to realize.

It will be clearly understood, of course, that the scope of our invention is not limited to the use of the specific ingredients hereinbefore described; for example, in the place of aluminum hydrate, oxide of aluminum containing some proportion of combined water, e. g. bauxite, may be used; and in place of sawdust, cork or any similar solid combustible organic substance may be substituted. Similarly the function of the fire clay being to act as a binder or carrier, taking no part in the catalytic reaction, other materials having similar physical properties may be utilized. A use of the sintering agent is to lower the temperature at which sintering may be effected and therefore it is possible to use other suitable fluxing agents which have no detrimental effect on the catalytic properties of aluminum hydrate in the catalyst.

Having thus fully described our invention what we claim as new and desire to secure by Letters Patent is:

1. The method of producing a sulphur dioxide reducing catalyst which comprises compounding a mixture containing aluminum hydrate, a refractory carrier material, a solid combustible substance and a sintering agent, moulding the mixture into a suitable shape, drying the moulded mixture and sintering it at a temperature sufficiently low to retain at least part of the water of hydration of the aluminum hydrate.

2. The method of producing a sulphur dioxide reducing catalyst which comprises compounding a mixture containing aluminum hydrate, a refractory carrier material, a solid combustible substance and sodium silicate, moulding the mixture into a suitable shape, drying the moulded mixture and sintering it at a temperature sufficiently low to fuse the aluminum hydrate particles to the refractory carrier and at the same time retain at least part of the water of hydration of the aluminum hydrate.

3. The method of producing a sulphur dioxide reducing catalyst which comprises compounding a mixture containing aluminum hydrate, fire clay, a solid combustible substance and a sintering agent, moulding the mixture into a suitable shape, drying the moulded mixture and sintering it at a temperature sufficiently low to fuse the particles of aluminum hydrate to the fire clay and at the same time retain at least part of the water of hydration of the aluminum hydrate.

4. The method of producing a sulphur dioxide reducing catalyst which comprises compounding a mixture containing aluminum hydrate, a refractory carrier material, sawdust and a sintering agent, moulding the mixture into a suitable shape, drying the moulded mixture and sintering it at a temperature sufficiently low to fuse the particles of aluminum hydrate to the refractory carrier and at the same time retain at least part of the water of hydration of the aluminum hydrate.

5. The method of producing a sulphur dioxide reducing catalyst which comprises compounding a mixture containing aluminum hydrate, a refractory carrier, a solid combustible substance and sodium silicate, moulding the mixture into a suitable shape, drying the moulded mixture and sintering it at a temperature sufficiently low to fuse the particles of aluminum hydrate to the carrier and at the same time retain at least part of the water of hydration of the aluminum hydrate.

6. The method of producing a sulphur dioxide reducing catalyst which comprises compounding a mixture containing aluminum hydrate, fire clay, sawdust and sodium silicate, moulding the mixture into a suitable shape, drying the moulded mixture and sintering it at a temperature sufficiently low to fuse the particles of aluminum hydrate to the fire clay and at the same time retain at least part of the water of hydration.

7. A sulphur dioxide reducing catalyst which comprises a sintered agglomerate of particles of aluminum hydrate fused to a refractory carrier material, said agglomerate being sufficiently porous to permit the free passage of reacting gases therethrough in contact with exposed surfaces of said particles, said particles retaining at least part of the water of hydration.

8. A sulphur dioxide reducing catalyst which comprises a sintered agglomerate of particles of aluminum hydrate fused to a refractory carrier material, said agglomerate being sufficiently porous to permit the free passage of reacting gases therethrough in contact with the exposed surfaces of said aluminum hydrate particles, said aluminum hydrate particles extending into the pores of the mass in the form of nodules and retaining at least part of the water of hydration.

ROBERT LEPSOE.
JAMES ROLAND MILLS.